United States Patent [19]
Newman

[11] Patent Number: 5,651,177
[45] Date of Patent: Jul. 29, 1997

[54] STATOR MANUFACTURING AND TESTING METHOD AND APPARATUS

[75] Inventor: Lawrence E. Newman, Tipp City, Ohio

[73] Assignee: Globe Products Inc., Huber Heights, Ohio

[21] Appl. No.: 578,822

[22] Filed: Dec. 26, 1995

Related U.S. Application Data

[63] Continuation of Ser. No. 212,262, Mar. 14, 1994, abandoned.

[51] Int. Cl.$^6$ .................. H02K 15/04; G01R 31/06; H01R 4/24
[52] U.S. Cl. .................. 29/596; 29/407.01; 29/605; 29/705; 29/732; 29/742; 29/593; 324/546; 439/391; 439/410; 242/432
[58] Field of Search .................. 29/407.01, 407.05, 29/596, 605, 564.4, 705, 732, 742, 593, 736; 269/254 R; 439/436, 391, 395, 409, 410; 324/545, 546, 772; 242/1.1 R, 7.07

[56] References Cited

U.S. PATENT DOCUMENTS

| | | | |
|---|---|---|---|
| 830,675 | 9/1906 | Rosenberger | 439/410 |
| 1,188,749 | 6/1916 | Frankel | 439/410 |
| 1,500,641 | 7/1924 | Sabourin | 439/410 |
| 2,903,064 | 9/1959 | Blonder . | |
| 3,455,007 | 7/1969 | Green | 29/705 |
| 3,626,358 | 12/1971 | Klassen | 439/410 |
| 3,706,122 | 12/1972 | La Valle | 29/705 |
| 3,932,811 | 1/1976 | Branch | 29/596 |
| 4,815,673 | 3/1989 | Wheeler | 29/596 X |
| 4,957,452 | 9/1990 | Bolliger | 439/410 |
| 4,984,353 | 1/1991 | Santandrea et al. | 29/596 X |
| 5,186,405 | 2/1993 | Beakes et al. . | |
| 5,186,648 | 2/1993 | Senra | 439/409 |
| 5,269,206 | 12/1993 | Yagawa . | |

OTHER PUBLICATIONS

Globe Products Inc. Drawing 165820, dated Feb. 15, 1991.
Globe Products Inc. Drawing 166420, dated Dec. 22, 1992.

*Primary Examiner*—S. Thomas Hughes
*Attorney, Agent, or Firm*—Roger S. Dybvig; John J. Cheek

[57] ABSTRACT

Stator coils having lead wires inserted into temporary wire clamps at a winding station are electrically tested before the coil lead wires are removed from the temporary clamps. The clamps each include a jaw formed with a wire-engaging surface which scrapes the insulating coating off from a lead wire as it is inserted therein. The clamps are mounted on an electrically insulating support and are electrically connected to terminal members which are engageable by electrical test terminal members.

17 Claims, 3 Drawing Sheets

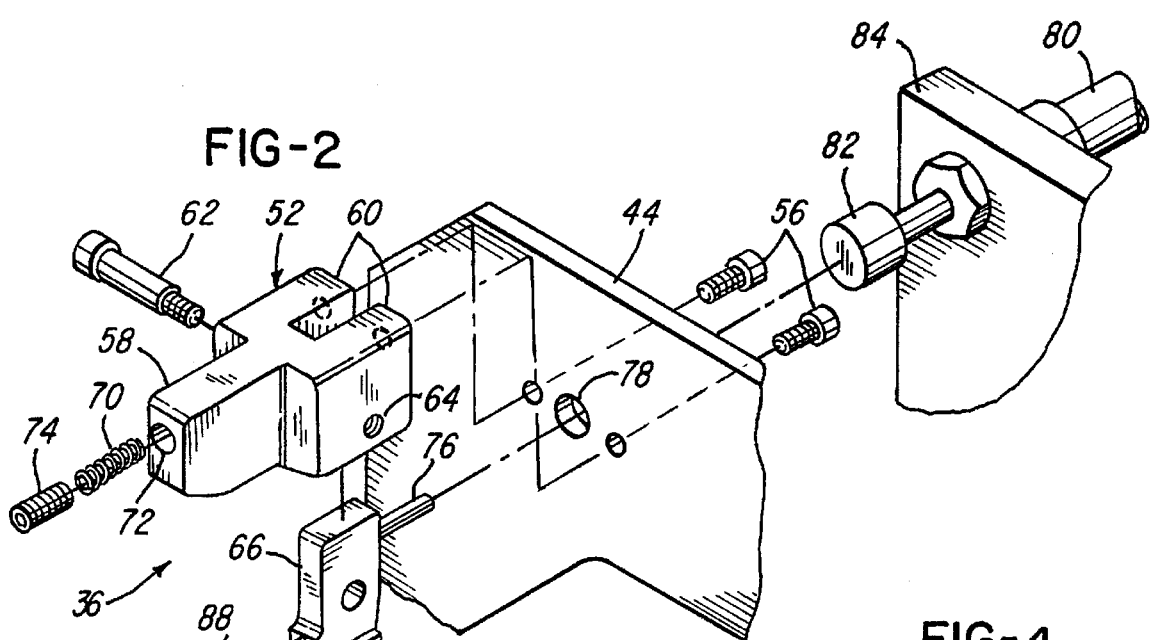
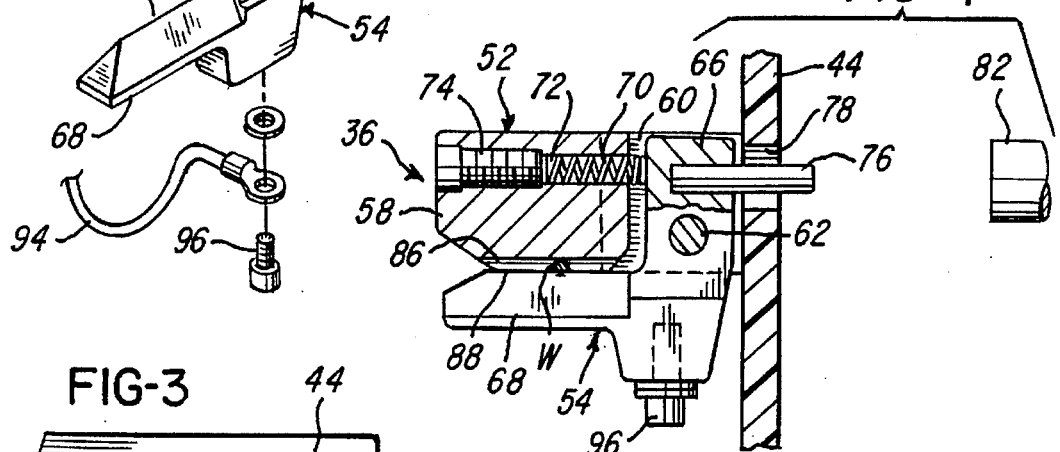
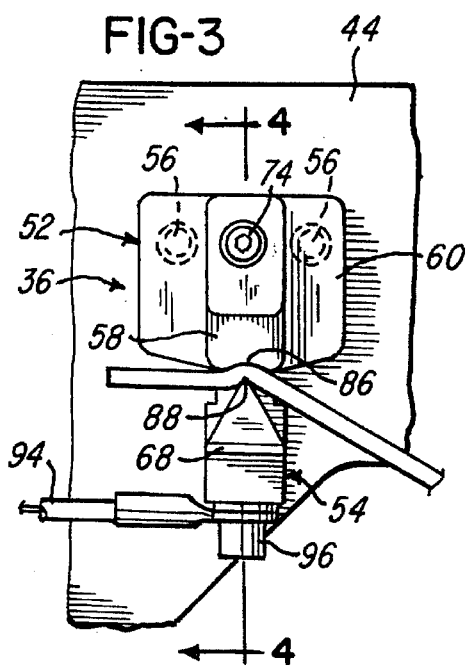
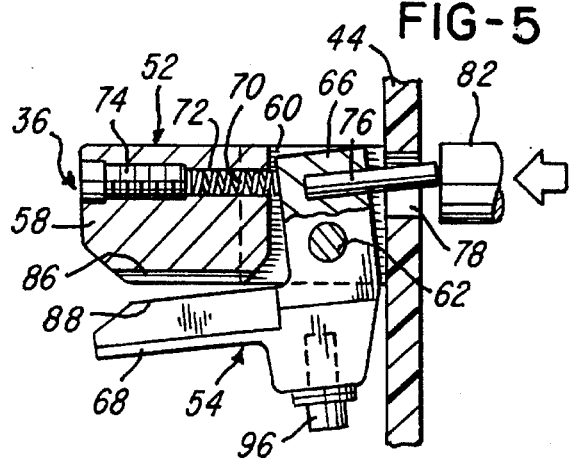

STATOR MANUFACTURING AND TESTING METHOD AND APPARATUS

This is a continuation of application Ser. No. 08/212,262 filed on Mar. 14, 1994, now abandoned.

FIELD OF INVENTION

This invention relates to a stator winding manufacturing and testing method and apparatus. This invention is especially adapted for the manufacture and testing of 2-pole stators for electric motors or other electrical devices.

BACKGROUND OF THE INVENTION

Modern stator manufacturing production lines include several different stations at which different manufacturing operations are performed. One such operation that is frequently accomplished at an early stage in the process for manufacturing a 2-pole stator, is to assemble stator coil terminals or supports therefor an unwound stator core. Thereafter, the stator coils are wound on the stator core pole pieces at a stator winding station using magnet wire having an electrically insulating coating. A common practice in use at this time is to temporarily clamp the stator coil lead wires to wire clamps during the winding process. At a later stage, the lead wires are connected to the terminals mounted on the stator core. Usually at a still later stage in the manufacture of the stator, the stator coils are tested for continuity and resistance.

One type of stator manufacturing machine, known as a turret winder, such as the machine 50 disclosed in Beakes et al. U.S. Pat. No. 5,186,405, granted Feb. 16, 1993, the disclosure of which is hereby incorporated by reference herein, includes a turret by which unwound stators having cores on which terminal members have previously been assembled are moved to a stator winding station at which the stator coils are wound and by which the freshly wound stators are then moved to a lead connect station at which the stator coil lead wires are connected to the terminal members on the core. The coil winding process typically requires more time to complete than do the lead wire connecting operations or the testing operations. It has been suggested that there would be an advantage to testing the coils of each stator for resistance and shorts while the stator is still in located on the turret of a turret winder. If the stator coils are tested immediately after being wound, the winding machine operations can be immediately halted in the event a stator fails a test procedure so that the condition which caused the failure can be promptly cured. This would avoid the possibility that a substantial number of similarly defective stators are wound before the defect is discovered.

SUMMARY OF THE INVENTION

This invention provides a stator manufacturing and testing method and apparatus by which stator coils can be electrically tested immediately after they are wound.

An object of this invention is to provide a stator manufacturing and testing method and apparatus in which the stator coil lead wires having an electrically insulating coating are connected to temporary wire clamps at a winding station and in which the stator coils are electrically tested, such as for resistance and shorts, before the coil lead wires are removed from the temporary clamps.

In accordance with this invention, the clamps each include a jaw formed with a wire-engaging surface, preferably a knife edge, which scrapes the insulting coating off from a lead wire as it is inserted therein. The clamps are mounted on an electrically insulating support and are electrically connected to terminal members which are engageable by electrical test terminal members.

Other objects and advantages will become apparent from the following description of the drawings.

BRIEF DESCRIPTION OF THE DRAWINGS

FIG. 2 is an enlarged, partially exploded, fragmentary perspective view of a portion of the apparatus shown in FIG. 1.

FIG. 3 is a fragmentary front elevational view of parts of the apparatus illustrated in FIG. 2 shown engaged with a stator coil lead wire.

FIG. 4 is a fragmentary side elevational view of the parts shown in FIG. 3. Portions of FIG. 4 are shown in vertical cross section along line 4—4 of FIG. 3.

FIG. 5 is a fragmentary cross sectional view similar to FIG. 4 but with parts shown at a stage of operation of the apparatus different from that illustrated by FIG. 4.

FIG. 6 shows the parts as if viewed in the direction of arrows 6—6 of FIG. 1 and along the section indicated thereby. FIG. 6 further includes a phantom line representation of a moved position of a tester terminal block forming part of this invention.

DETAILED DESCRIPTION

Figure 1:
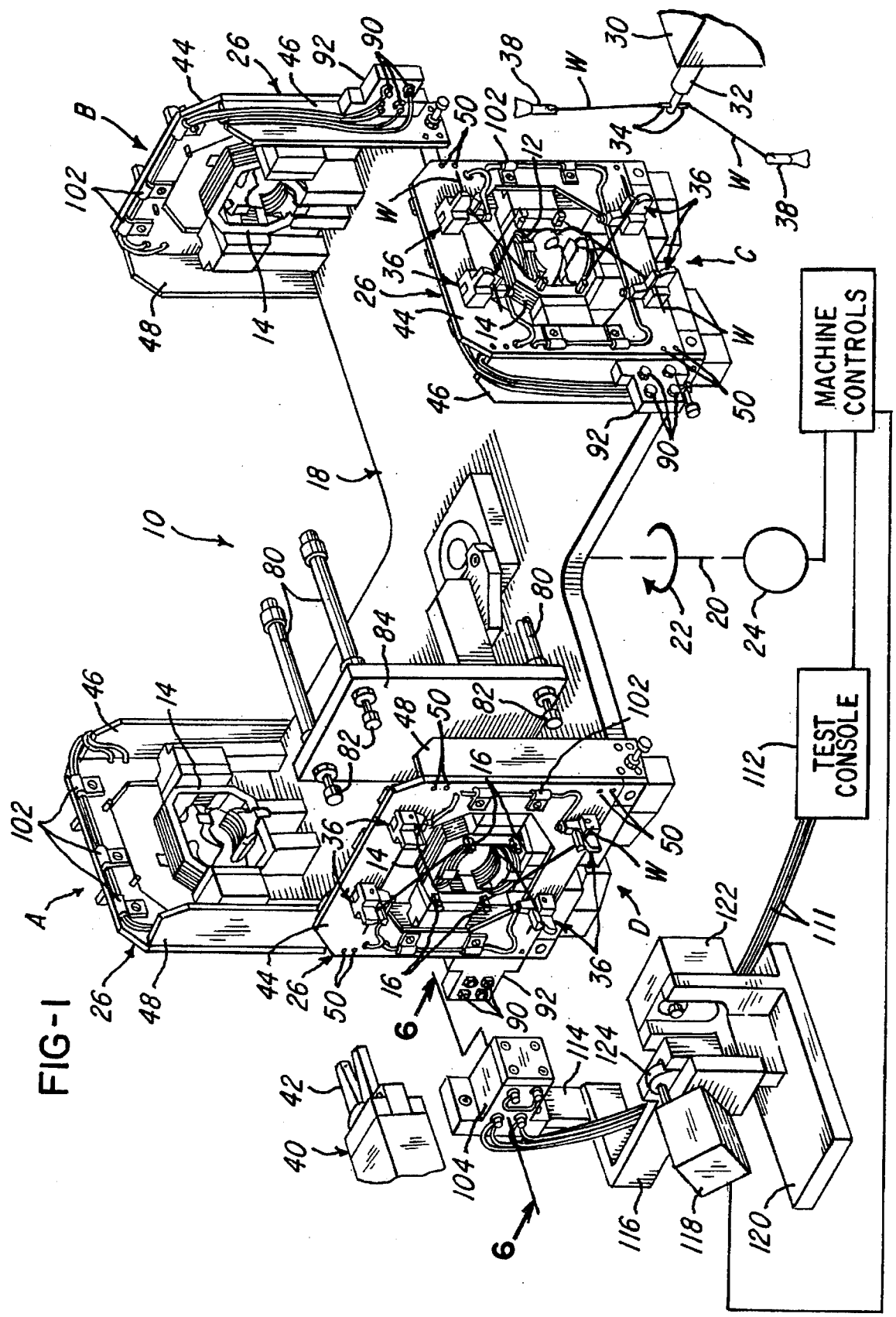
FIG. 1 is a partially diagrammatic, fragmentary, perspective view of portions of stator manufacturing and testing apparatus in accordance with this invention.
Figure 6:
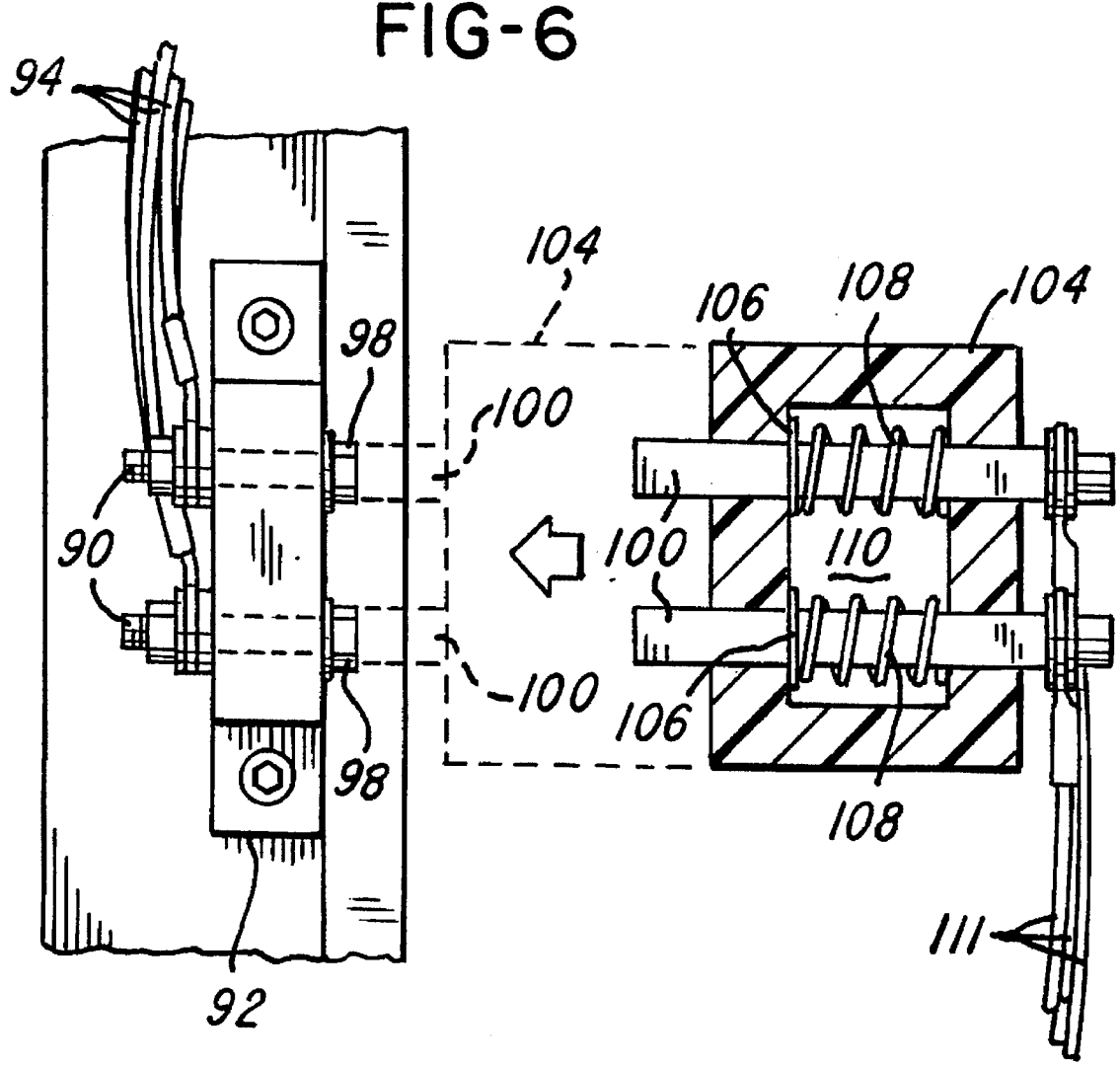
FIG. 6 is a fragmentary side elevational view, with parts in cross section, of another portion of the apparatus shown in FIG. 1.

With reference to FIG. 1, the stator manufacturing and testing apparatus of this invention is generally designated 10 and is used to wind coils 12 formed from insulated magnet wire onto a 2-pole stator 14, to test the coils 12 and their lead wires W, and to connect the lead wires W to stator terminals or stator terminal supports 16 mounted on the stator cores. All of the operations of the apparatus 10 are synchronized and controlled by suitable machine controls, diagrammatically illustrated in FIG. 1. Such controls are known, may be conventional, and are not further described herein.

Apparatus 10 includes a turret plate 18 mounted for rotation about a vertical axis 20 and repeatedly rotationally indexed through successive 90 degree increments in one direction, as indicated by the arrow 22, about its vertical axis 20 by a suitable indexing drive motor 24. Stators to be wound are clamped to an individual one of four stator support and clamp mechanisms, generally designated 26, to which they remain clamped throughout a complete cycle of operation of the apparatus of winding, testing, and lead connecting operations.

The four stator clamp mechanisms 26 are connected to the turret plate 18 at 90 degree spaced locations so that, in operation, after each 90 degree index of the turret plate 18, there will be a clamp mechanism 26 at each of four stations, namely a load/unload station A, an idle station B, a winding station C, and a coil lead terminating station D. At each of the stations, the stators are positioned with their center axes extending horizontally and substantially perpendicularly with respect to the vertical axis 20 of the turret plate 18 and with the end faces of the stators most remote from the vertical axis 20 in vertical orientations and spaced a fixed horizontal distance from the vertical axis 20 of the turret plate 18.

At the load/unload station A, a newly wound stator 14 is unclamped from its support and clamp assembly 26, removed from the turret plate 18, and replaced by an unwound stator 14. No operations are performed on the stator at the idle station B. At the winding station C, a pair of stator coils are wound by the operation of a winding head 30 located adjacent the winding station C that has a reciprocating and oscillating shuttle or ram 32 that draws wires from sources (not shown) of wire under tension and having wire guide needles 34 through which the wires exit as the coils are wound. The winding shuttle or ram 32 reciprocates and oscillates about a fixed horizontal axis in order to wind coils of wire around the stator pole pieces in a manner well known in the art.

At or about the time of the commencement of the winding of a pair of coils 12, the stator lead wires, known as "start wires," are inserted into a pair of temporary wire clamps 36 by the operation of a pair of movable wire grippers 38, which are preferably of the type shown in said U.S. Pat. No. 5,186,405. At the conclusion of the winding operation, the wire portions leading from the coils to the winding shuttle 32 are gripped by the wire grippers 38 to form coil finish lead wires extending from the coils 12, which are then positioned in other ones of the wire clamps 36. Wire cutting mechanisms associated with the wire grippers 38 cut the finish leads free from the wire grippers 38 so that the newly wound stator 14 is completely free from the winding shuttle 32. The wound stator 14 is then indexed by rotation of the turret plate 18 to the wire terminating station D at which the stator is electrically tested and the start and finish leads are removed from the wire clamps 36 and at least temporarily connected to terminals on the stator 14 by a robot 40 having a wire-gripping and manipulating end effector 42. The robot 40 may also be conventional and is not further described herein. Thus it may be seen that, when the newly wound stator returns to the load/unload station A, it may be simply unclamped from the turret plate 18 and removed. The foregoing operations are repeated to continuously wind stators.

At each turret station, the temporary wire clamps 36 are mounted on a clamp mounting plate 44 made from an insulating material, such as a phenolic resin or other plastic material, and which in turn is mounted on the outwardly facing edge surfaces of a mutually-spaced pair of support plates 46 and 48 affixed to the turret plate 18 by screws 50. The support plates 46 may be referred to as the leading plates with reference to the direction of rotation of the turret plate 18 indicated by the arrow 22.

With reference to FIGS. 2 through 5, each temporary wire clamp 36 includes a pair of wire clamp members, namely a fixed clamp member 52 and a movable or pivotal clamp member 54. The pivotal clamp member 54 and, optionally, the fixed clamp member 52, are made from a hardened tool steel or other suitable electrically conductive material. Fixed clamp member 52 is fixedly mounted on the clamp mounting plate 44 by screws 56 and comprises a body member having a horizontal jaw 58 and a bifurcated portion abutting the clamp mounting plate 44 that forms a clevis yoke 60 through which a clevis pin 62 extends. Clevis pin 62, which may simply be a shoulder screw, has a threaded end engaged in a tapped hole 64 in one of the bifurcations of the clevis yoke 60. The pivotal clamp member 54 comprises an L-shaped body member having a generally vertical leg 66 pivotally supported by the clevis pin 62. Pivotal clamp member 54 further includes a generally horizontal, movable clamp jaw 68 that confronts the fixed clamp jaw 58.

A clamp spring 70 is mounted partly within in a through bore 72 in the fixed clamp member 52 and has one end which bears against the outwardly facing surface of the vertical leg 66 of the pivotal clamp member 54. The other end of the clamp spring 70 abuts against the inner end of a retaining screw 74 which is located in the tapped, outer end of the through bore 72. Clamp spring 70 is under compression so that it pushes against the vertical leg 66 of the pivotal clamp member 54, which causes the pivotal clamp jaw 68 to be pressed against the fixed jaw 58. Accordingly, a lead wire W inserted between the fixed jaw 58 and the movable jaw 68 will be securely clamped between the jaws 58 and 68, as is shown in FIG. 4.

With reference to FIGS. 4 and 5, in order to release the clamped wire from a temporary clamp 36, a release pin 76 is fixed in the vertical leg 66 of the pivotal movable clamp member 54 and extends rearwardly completely through and beyond a through bore 78 in the clamp mounting plate 44. An air operated clamp release actuator 80 is energized to extend a fitting 82 at the end of its piston rod into engagement with the rearwardly projecting end of the release pin 76 and thereby overcome the bias of the clamp spring 70 and reversely pivot the pivotal clamp member 54 so that its jaw 68 moves away from the fixed jaw 58 as shown in FIG. 5. For reasons which will become apparent, the piston rod fitting 82 is preferably made from a plastic insulating material or else has an insert (not shown) made of such material that engages the release pin 76 so that there can be no accidental electrical connection between the release pin 76 and the clamp release actuator 80.

As shown in FIG. 1, there are four clamp release actuators 80, one for each temporary clamp 36, mounted on a vertical support plate 84 that is fixed and does not rotate with the turret plate 18. Therefore, the clamp release actuators remain adjacent the testing and lead wire connect station D at all times. Here it may be noted that there are occasions when more than four temporary clamps 36 may be used, particularly for stators having coils with intermediate taps. As is obvious, there would then be more than four clamp release actuators 80.

The confronting surfaces of the fixed clamp jaw 58 and the movable clamp jaw 68 are contoured not only to firmly grip the lead wire segments W but also to scrape away the insulating coating on the lead wires as they are inserted therein. By scraping away the insulation in this manner, an electrical connection is formed between each lead wire and its associated pivotal clamp member 54. With continued reference to FIGS. 2 through 5, the mutually confronting surfaces of the fixed clamp jaw 58 and the movable clamp jaw 68 are contoured to have beveled outer ends by which the lead wire segments W are guided therebetween as a result of the movements of the lead wire grippers 38. In addition, the fixed clamp jaw 58 has a shallow, longitudinally-extending groove 86 confronting the pivotal jaw 68 and the pivotal jaw 68 has beveled side faces that join at a longitudinally-extending knife edge 88 that confronts the center of the shallow groove 86 in the fixed clamp jaw 58. As a result of this construction, the insulating coating on a lead wire is stripped away by the knife edge 88 as the lead wire is being inserted between the clamp jaws 58 and 68 by operation of the wire grippers 38 into the position illustrated in FIGS. 3 and 4. Here, it may be noted as apparent that the clamp springs 70 must be sufficiently strong to hold the pivotal clamp jaws 54 in position to effect the scraping away of the insulating coating on the lead wires as described above.

Further in accordance with this invention, as best illustrated in FIGS. 1, 2, 3 and 6, each pivotal clamp jaw 68 is electrically connected to an electrical terminal member 90 mounted on a terminal block 92 which itself is mounted on the associated leading support plate 46. Such electrical connection is provided by means of an insulated connector wire 94 connected at one end to a mounting screw 96 projecting from the pivotal clamp and connected at its other end to the terminal member 90. Terminal member 90 may conveniently comprise a brass screw, the head 98 of which has been faced off flat. Terminal screw head 98 projects out the front side of terminal block 92 so that it can be engaged by a cooperating tester terminal member 100 aligned therewith. Insulated connector wires 94 are clamped to the mounting plate 44 by suitable clips 102 and extend through to the backside of the mounting plate 44 and around the top rear of the mounting plate 44 to their associated clamp terminals 90 on the terminal block 92.

With reference to FIG. 1, there is one tester terminal member 100 aligned with each of the clamp terminal members 90. Tester terminal members 100 are preferably made from square brass rod material and are held within square bores in the front and rear walls of a tester terminal housing 104 so that they cannot rotate. An intermediate portion of each tester terminal member 100 is grooved for connection of a suitable retaining ring 106, such as an e-ring or a c-clip, thereto and is surrounded by a coil spring 108. All of the retaining rings 106 and the coil springs 108 are located within a hollow compartment 110 within the tester terminal housing 104 with the springs 108 placed under compression so that the retaining rings 106 and, accordingly, the tester terminal members 100 are biased toward the clamp terminal members 90. Therefore, the tester terminal housing 104 can be advanced, as will be described below, toward the clamp terminals 90 to the point at which the tester terminal springs 108 are further compressed so that good electrical contact is effected between the clamp terminals 90 and the tester terminals 100. The ends of the tester terminals 100 are connected by connector wires 111 to an electric test console 112 which performs such electrical tests on the coils 12 and their lead wires as are desired. Preferably such tests are carried out automatically and, in the event of a failure, operation of the winding and testing apparatus 10 is interrupted until the problem which caused the test failure can be cured. The nature of the tests and the mechanical and electronic construction of the test console 112 may be conventional and form no part of this invention. Assuming the test results are acceptable, the tester terminal housing 104 is retracted from the turret 18, causing a disconnection of the tester terminals 100 from the clamp terminals 90, and the robot 40 is then energized to effect connection of the coil lead wires to the terminals or terminal supports 16.

The tester terminal housing 104 is mounted on a stanchion 114 projecting upwardly from an L-shaped, tooling support arm 116 which is driven toward and away from the turret plate 18 in order to effect electrical connection and disconnection of the tester terminal members 100 with the clamp terminals 90 by means of a tooling positioning actuator 118, which is preferably a double-acting linear air actuator, mounted on an immovable support member 120. A second air actuator 122 is shown mounted on the immovable support member 120. It can be used to prevent over travel or to reversely position the tooling support arm 116, and is not essential to the operation of the apparatus of this invention.

To reduce the load on the tooling actuator 118, the stanchion 114 and its support arm 116 are preferably made from aluminum or other lightweight metal. To resist damage to the aluminum material, a steel insert (not shown) can be mounted in the support arm 116 aligned with the piston rod of the second air actuator 122 in the event the latter actuator 122 may be used to position the support arm 116. The support arm 116 can be connected by screws (not shown) to a mounting plate 124 connected to the piston and guide rods projecting from the tooling 118. To resist having the support arm 118 twist or sag, it preferably is formed with a channel in which the mounting plate 124 is snugly received.

While the electrical connections between the clamps and the test console described above are presently preferred, it will be apparent that different electrical connections, such as pin and socket connectors (not shown), could be used to connect the wire leads of the tester console to the wire leads from the clamps.

Although the presently preferred embodiment of this invention has been described, it will be understood that within the purview of the invention various changes may be made within the scope of the following claims.

I claim:

1. Stator manufacturing and testing apparatus comprising:

a support for a stator to be manufactured;

plural wire clamps adapted to temporarily receive stator coil lead wires, each of said clamps having a pair of clamp jaws, one of said clamp jaws of each pair including an insulation cutting element;

a structure made from electrical insulating material that supports said wire clamps in fixed relation to said stator support;

a plurality of clamp terminals, one for each of said clamps, mounted in fixed relation to said support structure and electrically connected to respective ones of said clamps;

apparatus for winding stator coils having lead wires and wound from insulated magnet wire on the stator while the stator is positioned on the support, said winding apparatus being located at a winding station;

apparatus for inserting the stator coil lead wires into said wire clamps at said winding station;

an electrical tester having test terminals; and apparatus for moving said test terminals into engagement with said clamp terminals to enable electrical tests to be conducted by said electrical tester.

2. The apparatus of claim 1 further including lead wire connect apparatus at a lead wire connect station that engages the coil lead wires temporarily held by said clamps and connects them to said terminal members and stator transfer apparatus that moves the stator from the winding station to the lead wire connect station, and wherein said test terminals are moved into engagement with said clamp terminals at said lead wire connect station.

3. A stator manufacturing and testing method comprising the steps of:

winding coils of magnet wire having an insulating coating onto a stator core, said coils having coil lead wires; and before each of said coil lead wires are connected to terminal members on the stator core, performing the following steps:

inserting said coil lead wires into respective clamps, each clamp having a cutting edge and said inserting step comprising drawing each of said coil lead wires across the cutting edge of its associated clamp to remove a portion of the insulating coating from the lead wire while it is being inserted into its associated clamp so that each said lead wire is electrically connected to its associated clamps electrically connecting an electric tester to said clamps, and testing said coils with said electric tester.

4. The method of claim 3 wherein said tester is electrically connected to said clamps by mounting a terminal block having plural clamp terminals, one for each clamp, in fixed relation to said clamps and moving terminals connected to said tester into engagement with said clamp terminals.

5. The method of claim 4 wherein said steps of winding and inserting are accomplished with the stator supported at a single location, and further including the step of transferring said stator, said clamps and said clamp terminals to a different location at which said testing step is carried out.

6. The method of claim 5 wherein said stator is supported on a rotatable turret and said transferring step is carried out by rotating said turret.

7. A stator manufacturing and testing method comprising the steps of:

winding coils of magnet wire having an insulating coating onto a stator core, said coils having coil lead wires;

inserting said coil lead wires into respective clamps, each of said clamps having a cutting edge which removes a portion of the insulating coating from the lead wire inserted therein so that each said lead wire is electrically connected to its associated clamp;

electrically connecting an electric tester to said clamps by mounting a terminal block having plural clamp terminals, one for each clamp, in fixed relation to said clamps and moving terminals connected to said tester into engagement with said clamp terminals; and testing said coils with said electric tester.

8. The method of claim 7 wherein said steps of winding and inserting are accomplished with the stator supported at a single location, and further including the step of transferring said stator, said clamps and said clamp terminals to a different location at which said testing step is carried out.

9. The method of claim 8 wherein said stator is supported on a rotatable turret and said transferring step is carried out by rotating said turret.

10. For use in temporarily clamping stator lead wires made from magnet wire having an insulating coating, a wire clamp comprising a pair of relatively movable clamp jaws made from electrically conductive material, one of said jaws having an insulation-scraping means for scraping the insulating coating off a coated magnet wire while the wire is being inserted between the jaws, and spring means biasing said jaws toward one another with sufficient force that the insulating coating will be scraped off a coated magnet wire by the insulation-scraping means while the wire is being inserted between said jaws.

11. The wire clamp of claim 10 wherein said insulation-scraping means comprises a knife edge facing the other of said jaws.

12. A stator clamping and testing assembly comprising a stator support assembly, a clamp support plate made from electrical insulating material, a plurality of clamps mounted on electrical insulating portions of said clamp support plate; an electrical terminal block mounted in fixed relation to said clamp support plate; a plurality of terminal members supported by said terminal block, one for each of said clamps, and electrically connected to said respective ones of said clamps.

13. The assembly of claim 12 wherein each of said clamps comprises a pair of relatively movable clamp jaws, one of said jaws having an insulation-scraping wire-engaging surface facing the other of said jaws, and spring means biasing said jaws toward one another with sufficient force that the insulating coating will be scraped off a coated magnet wire while it is being inserted between said jaws.

14. Stator manufacturing and testing apparatus comprising:

a support for a stator to be manufactured;

apparatus for winding stator coils having lead wires wound from insulated magnet wire on the stator while the stator core is positioned on the support, said winding apparatus being located at a winding station;

plural wire clamps each adapted to temporarily receive a portion of one of said stator coil lead wires;

a structure made from electrical insulating material that supports said wire clamps in fixed relation to said stator support;

apparatus for inserting a portion of each of the stator coil lead wires into respective ones of said wire clamps at said winding station before said lead wires are connected to terminal members mounted on said stator core;

an electrical tester; and means for electrically connecting said tester to said portions of said stator coil lead wires clamped by said clamps.

15. The apparatus of claim 14 wherein each of said clamps comprises a pair of opposed clamp jaws, at least one of said clamp jaws of each of said clamps being formed from an electrically-conductive material, and wherein said connecting means comprises:

a knife edge formed on the electrically-conductive clamp jaw of each of said clamps and confronting the other of said jaws; and means for electrically connecting said one of said jaws of each of said clamps to said tester.

16. A stator manufacturing and testing method comprising the steps of:

inserting a portion of each of a plurality of stator coil lead wires into respective clamps by which said lead wires are temporarily gripped before the coil lead wires are connected to terminal members on a stator core; and before each of said coil lead wires are connected to terminal members on the stator core, performing the following steps:

electrically connecting an electric tester to the portions of said lead wires held by said clamps, and testing said stator coils using said tester.

17. The method of claim 16 wherein said connecting step comprises penetrating an insulating coating on each of said lead wires with an electrically-conductive portion of its associated clamp and electrically connecting said electrically-conductive portion of each clamp to said electric tester.

* * * * *